US009388792B2

(12) United States Patent
Baker

(10) Patent No.: US 9,388,792 B2
(45) Date of Patent: Jul. 12, 2016

(54) DISTRIBUTED CONTROL SYSTEM

(71) Applicant: Frontier Wind, LLC, West Conshohocken, PA (US)

(72) Inventor: Jonathon P. Baker, Roseville, CA (US)

(73) Assignee: Frontier Wind, LLC, West Conshohocken, PA (US)

( * ) Notice: Subject to any disclaimer, the term of this patent is extended or adjusted under 35 U.S.C. 154(b) by 537 days.

(21) Appl. No.: 13/837,360

(22) Filed: Mar. 15, 2013

(65) Prior Publication Data

US 2014/0271187 A1    Sep. 18, 2014

(51) Int. Cl.
| | | |
|---|---|---|
| F03D 1/00 | (2006.01) | |
| F03D 9/00 | (2006.01) | |
| F03D 7/02 | (2006.01) | |
| F03D 7/04 | (2006.01) | |

(52) U.S. Cl.
CPC ............. F03D 7/022 (2013.01); F03D 7/024 (2013.01); F03D 7/0224 (2013.01); F03D 7/0228 (2013.01); F03D 7/0232 (2013.01); F03D 7/04 (2013.01); F05B 2240/40 (2013.01); F05B 2260/845 (2013.01); Y02E 10/721 (2013.01); Y02E 10/722 (2013.01); Y02E 10/723 (2013.01)

(58) Field of Classification Search
CPC ......... F03D 7/022; F03D 7/04; F03D 7/0228; F03D 7/0232; F03D 7/0224; F03D 7/024; Y02E 10/723; Y02E 10/722; Y02E 10/721; F05B 2240/40; F05B 2260/845
USPC ................... 416/1, 61, 151; 415/4.1, 4.2, 4.4; 290/44, 55
See application file for complete search history.

(56) References Cited

U.S. PATENT DOCUMENTS

| | | | |
|---|---|---|---|
| 7,939,955 B2 | 5/2011 | Steiner et al. | |
| 8,116,914 B2 | 2/2012 | Oohara et al. | |
| 8,324,749 B2 | 12/2012 | Minami et al. | |
| 8,459,946 B2 | 6/2013 | Yoshida | |
| 2006/0145483 A1* | 7/2006 | Larsen | F03D 7/022 290/44 |
| 2008/0069692 A1 | 3/2008 | Oohara et al. | |
| 2009/0285682 A1* | 11/2009 | Baker | F03D 1/0641 416/1 |

(Continued)

FOREIGN PATENT DOCUMENTS

| | | |
|---|---|---|
| EP | 1903213 A2 | 3/2008 |
| JP | S63192968 A | 8/1988 |

(Continued)

OTHER PUBLICATIONS

Jan. 30, 2015—(KR) Notice of Preliminary Rejection—App 10-2014-0030215.

(Continued)

*Primary Examiner* — Hoang Nguyen
(74) *Attorney, Agent, or Firm* — Banner & Witcoff, Ltd.

(57) ABSTRACT

A system and method for pressure based load measurement are provided. The system and method measure at least one pressure differential on an airfoil and determine at least one aerodynamic load associated with the at least one pressure differential. The determined at least one load is used to modify characteristics of the airfoil to increase efficiency and/or avoid damage. The determined at least one aerodynamic load may be further utilized to balance and/or optimize loads at the airfoil, estimate a load distribution along the airfoil used to derive other metrics about the airfoil, and/or used in a distributed control system to increase efficiency and/or reduce damage to, e.g., one or more wind turbines.

20 Claims, 12 Drawing Sheets

(56) References Cited

U.S. PATENT DOCUMENTS

| | | |
|---|---|---|
| 2009/0295161 A1 | 12/2009 | Steiner et al. |
| 2010/0014971 A1* | 1/2010 | Risager ................ F03D 7/0224 416/1 |
| 2010/0215493 A1* | 8/2010 | Abdallah .............. F03D 7/0232 416/23 |
| 2010/0266405 A1 | 10/2010 | Mayda |
| 2010/0296932 A1 | 11/2010 | Yoshida |
| 2011/0304140 A1 | 12/2011 | Minami et al. |
| 2012/0087792 A1 | 4/2012 | Cousineau et al. |
| 2012/0134814 A1* | 5/2012 | McGrath ............... F03D 7/0252 416/23 |
| 2014/0103656 A1 | 4/2014 | Azegami et al. |

FOREIGN PATENT DOCUMENTS

| | | |
|---|---|---|
| JP | 2005-030263 A | 2/2005 |
| JP | 2008-075521 A | 4/2008 |
| JP | 2009-523208 A | 6/2009 |
| JP | 2010-270703 A | 12/2010 |
| JP | 2013-011233 A | 1/2013 |
| WO | 2011/101995 A1 | 8/2011 |
| WO | 2012/147118 A1 | 11/2012 |

OTHER PUBLICATIONS

Mar. 17, 2015—(CA) Office Action—App 2,845,432.
Notice of Reasons for Rejection for Japanese patent application No. 2014-052337 mailed Oct. 31, 2014.
May 6, 2015—(AU) Patent Examination Report No. 1—2014201457.
Sep. 30, 2015—(CA) Office Action—App 2,845,432.

* cited by examiner

DISTRIBUTED CONTROL SYSTEM

TECHNICAL FIELD

Aspects relate to a distributed control system for a wind turbine.

BACKGROUND

Measurement of load in mechanical and electronic devices is often used to optimize performance. Excessive loads may strain the system and result in damage or lower efficiency. In the aerodynamics field, for example, blades or wings may be susceptible to excess loads due to the direction and magnitude of air flow. Similarly, in hydrodynamics, loads sustained from water flow may also affect efficiency and increase the potential for damage. To measure loads, various types of sensors may be used including pressure gauges, strain gauges, force sensors (e.g., transducers) and the like. In some instances, the placement of the various sensors may affect the accuracy of the load measurements.

SUMMARY

This summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Aspects described herein relate to determining or estimating load on a device based on various placements of sensors on the device. In one example, determining the aerodynamic load on a turbine blade or airplane wing may involve identifying barometric (i.e., ambient air) pressure, ambient air temperature, rotor speed, blade pitch angle, radial location of sensors, and blade twist angle. Using these factors, an aerodynamic load may be calculated using a predetermined number of sensors included in the blade. For example, two pressure sensors may be used to determine a pressure differential. Based on the pressure differential of the two sensors and one or more of the factors noted above, the aerodynamic load on the blade may be determined.

According to some aspects of the disclosure, determining or estimating an aerodynamic load on an aerodynamic load-bearing member might only require placement of two pressure sensors on the aerodynamic load-bearing member. Other data inputs used to calculate the aerodynamic load may be determined from the pressure sensors or other sensors that are not mounted on or otherwise included in the blade. For example, ambient air temperature may be calculated using a temperature gauge mounted on the rotor, nacelle, or tower.

According to other aspects of the disclosure, determining or estimating an aerodynamic load may be used to balance loads on the blades of a wind turbine. For example, two pressure sensing orifices may be provided at each blade of a wind turbine to determine a pressure differential. Using the pressure differential and other factors listed above, a load may be estimated at each blade. The loads at each blade may be compared to determine if loads are balanced among the blades and/or if loads at each blade are within an optimal range.

According to other aspects of the disclosure, determining or estimating an aerodynamic load on an aerodynamic load bearing member may be used to determine or estimate a load distribution along the member. Determining a load distribution along the aerodynamic load bearing member may be used to determine other metrics associated with the member including, e.g., displacement of the load bearing member, velocity of the load bearing member, acceleration of the load bearing member, and a moment acting on the load bearing member.

According to other aspects of the disclosure, distributed control systems may be used within a wind turbine or among multiple wind turbines. These distributed control systems may modify one or more characteristics of each wind turbine in response to estimating loads associated with one or more wind turbines. In one embodiment, multiple controllers perform desired modifications such that each controller may act as a substitute or failsafe in the event another fails. In another embodiment, a controller may modify characteristics in response to a controller at a related wind turbine estimating a load at the related wind turbine.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

Figure 1:
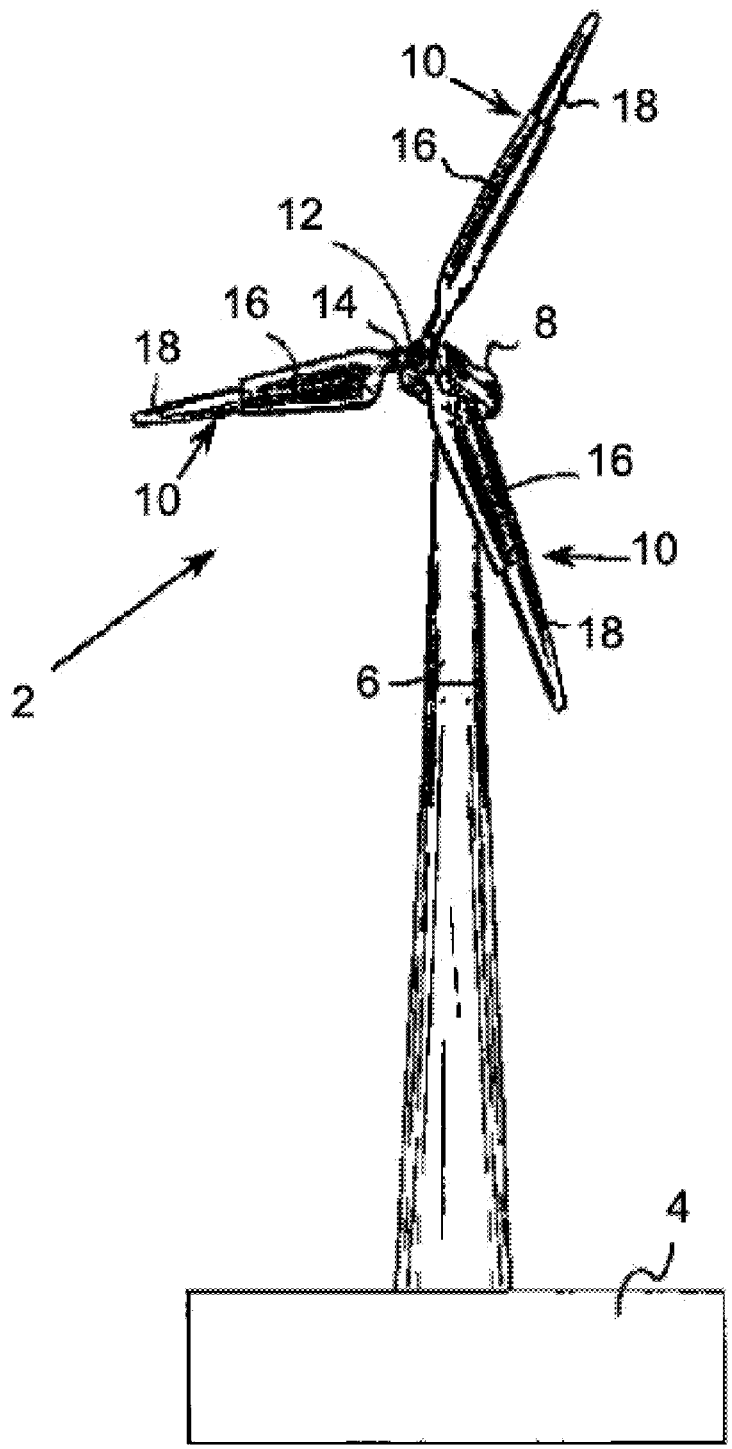
FIG. 1 illustrates a perspective view of a wind turbine according to one embodiment of the disclosure.

FIG. 1 illustrates a wind turbine 2 on a foundation 4 with a tower 6 supporting a nacelle 8. One or more blades 10 are attached to a hub 12 via a bolt flange 14. The hub 12 is connected to a drive train (not shown) within the nacelle 8. In one arrangement, blades 10 may be fixed length rotor blades having root portion 16 and tip portion 18. In another arrangement, the blades 10 may be variable length blades having a root portion 16 and a tip portion 18. Variable length blades may be configured to extend and retract given certain conditions. Various modes for controlling a variable length blade may be used to optimize or otherwise increase the effectiveness of such blades and/or a turbine such as wind turbine 2 to which the blades are attached. Any desirable drive system, such as a screw drive, a piston/cylinder, or a pulley/winch arrangement may be used to move the tip portion 18 with respect to the root portion 16. Such drive systems are described in U.S. Pat. No. 6,902,370, titled "Telescoping Wind Turbine," and filed Jun. 4, 2002, which is hereby incorporated by reference. The wind turbine 2 further includes a yaw drive and a yaw motor, and may include a pitch control system, not shown. Alternatively or additionally, blades 10 may include a mix of variable length and fixed length rotor blades.

According to yet other aspects, blades 10 may include one or more deployable air deflectors configured to modify airflow by extending from a surface of blades 10. In other embodiments, additional features (not shown) and/or methods may be used to modify airflow along a blade. For example, blade pitch may be modified, one or more plasma actuators may be actuated, a wind turbine may utilize active suction/blowing, one or more flaps disposed on a blade may be activated, etc., in order to modify the airflow. Modification of the airflow may result in the increase of lift and/or decrease in load. A controller may thus modify the power output, efficiency, load and the like using the deployable air deflectors. Examples of deployable air deflectors are described in U.S. patent application Ser. No. 12/122,584, titled "Wind Turbine with Gust Compensation Air Deflector," and filed May 16, 2008, which is hereby incorporated by reference.

Figure 2:
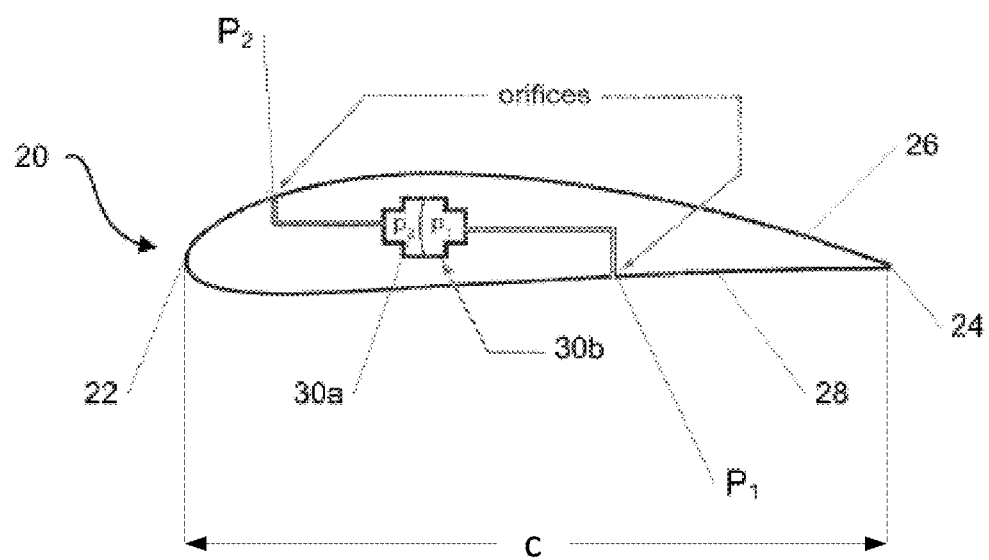
FIG. 2 illustrates a cross-section of an airfoil comprising a pressure based load measurement system according to one embodiment of the disclosure.

FIG. 2 illustrates one example cross section of an airfoil, such as from an airplane wing, wind turbine blade, etc. as used in conjunction with the present disclosure. The airfoil includes a leading edge 22, a trailing edge 24, a top surface 26, and a bottom surface 28. A chord line, c, can be defined as a line between the leading edge 22 and the trailing edge 24 of the airfoil 20. The airfoil 20 shown in FIG. 2 is merely one illustrative cross-sectional design and it is recognized that infinite cross-sectional variations can be used as part of the present invention. The airfoil 20 may be made of any suitable construction and materials, such as fiberglass and/or carbon fiber.

With further reference to FIG. 2, the blade 20 includes orifices at two pressure sensing locations, P1 and P2. P1 is located on the bottom surface 28 of the blade 20 and P2 is located on the top surface 26 of the blade 20. A pressure transducer, 30, is provided to measure pressure differential between the two pressure sensing locations. Locations 30a, 30b indicate opposing sides of the pressure transducer diaphragm to determine the pressure differential between each point P1 and P2. In an alternate arrangement, multiple pressure transducers may be used. The location of P1 and P2 shown in FIG. 2 is merely illustrative of one example location of each orifice. The location of P1 and P2 may be generally dependent on the blade 20 or wing cross-sectional geometry. In one example, the location of the pressure sensors and ports may correspond to 0.125 c and 0.150 c on the pressure and suction surfaces, respectively, where c represents the chord length. This range may, in some examples, be preferable to reduce the error to within a specified threshold (e.g., 7%). In some embodiments, P1 and P2 may be disposed, e.g., between 5% and 70% of the length of chord c, and, in some embodiments, disposed, e.g., between 10% and 60% of the length of chord c.

Using the pressure differential between $P_1$ and $P_2$, a controller may determine various loads of a blade including a lifting load, a normal force load, a tangent force load, an in-plane (power producing) load, and a rotor normal load. More specifically, the aerodynamic forces and moments generated along the span of a blade are proportional to a difference in pressure between two points on an airfoil surface. Using a determined local dynamic pressure and the measured pressure differential (i.e., the difference in pressures between $P_1$ and $P_2$), the loads acting upon a blade can be readily determined. Generally, the local dynamic pressure (or estimated value thereof) may be determined using the following equation:

$$q_{est} \equiv \tfrac{1}{2} \rho_\infty v_{est}^2 \tag{1}$$

where $\rho_\infty$ corresponds to the ambient air density and $v_{est}$ corresponds to the estimated local air speed at the pressure sensors. For a wind turbine, an estimate of the wind air speed can be obtained using the rotor speed and wind speed, as defined in equation 2:

$$v_{est} = \sqrt{\omega_{rotor}^2 r_{sensor}^2 + v_{wind,est}^2} \tag{2}$$

That is, an estimated value of local air speed in the vicinity of the pressure sensors ($v_{est}$) may be calculated using the known rotor speed ($\omega_{rotor}$), the radial position of the pressure sensors ($r_{sensor}$), and the wind speed ($v_{wind,est}$). In some instances, the wind speed might not be directly measurable (e.g., sensors might not be used or included in the blade or turbine to measure the wind speed). In such instances, the wind speed may be determined empirically using the wind turbine as an anemometer. The following set of equations estimate wind speed based upon the rotor speed depending on the pitch angle of the blade ($\beta$):

$$v_{wind,est} \approx \begin{cases} \kappa_{\omega 1} \omega_{rotor} + \kappa_{\omega 0} & \text{for } \beta = \beta_{min} \text{ (Region II)} \\ \kappa_{p2} \beta^2 + \kappa_{p1} \beta + \kappa_{p0} & \text{for } \beta > \beta_{min} \text{ (Region III)} \end{cases} \tag{3}$$

where $\kappa_{\omega\#}$ and $\kappa_{p\#}$ represent empirically determined coefficients and $\beta$ represents the blade pitch having a minimum of $\beta_{min}$. The different regions may have different load profiles and thus require different algorithms or formulas for determining the estimated load given the various data inputs. As one particular example in which simulations were performed for a 750 kW ZOND™ turbine with a 48 m rotor comprised of three EUROS™ blades, the following Region II and Region III coefficients were determined:

| Region II | Region III |
|---|---|
| $\kappa_{\omega 1} = 2.913$ m/rad | $\kappa_{p2} = 68.739$ m/(s·rad$^2$) |
| $\kappa_{\omega 0} = -0.094$ m/s | $\kappa_{p1} = 14.307$ m/(s·rad) |
| | $\kappa_{p0} = 10.331$ m/s |

Once the local dynamic pressure has been calculated, it is used to nondimensionalize the measured pressure differential, resulting in a pressure differential coefficient ($C_{\Delta P}$) as detailed in equation 4:

$$C_{\Delta p} \equiv \frac{\Delta p}{q_{est}} \quad (4)$$

This pressure differential coefficient, along with empirically determined constants, can be used to estimate each load associated with the blade. Specifically, in one embodiment, in order to calculate any of the above-noted loads (e.g., lifting load, normal force load, tangent force load, in-plane load) based on the measured pressure differential, a coefficient for each force corresponding to each load is calculated using the determined pressure differential coefficient. Equations 5, 6, and 7 are example formulas for calculating the lift force coefficient ($C_{l,est}$), normal force coefficient ($C_{n,est}$), and tangent force coefficient ($C_{t,est}$), respectively. In some arrangements, these coefficients may represent estimated coefficients or values rather than actual.

$$C_{l,est} = \kappa_{l1} C_{\Delta p} + \kappa_{l0} \quad (5)$$

$$C_{n,est} = \kappa_{n1} C_{\Delta p} + \kappa_{n0} \quad (6)$$

$$C_{t,est} = \kappa_{t2} C_{\Delta p}^2 + \kappa_{t1} C_{\Delta p} + \kappa_{t0} \quad (7)$$

In equations 5, 6, and 7, $\kappa_{l\#}$, $\kappa_{n\#}$ and $\kappa_{t\#}$ each represent empirical coefficients that may depend upon local blade section geometry and pressure orifice installation locations. As shown by equations 5, 6, and 7, the pressure differential coefficient has a linear relationship with each of the lift force coefficient and the normal force coefficient, and has a quadratic relationship with the tangent force coefficient. To determine each of the empirical coefficients, the linear or quadratic relationship may be fitted to empirical or calculated data collected for the type of blade (e.g., blade section geometry) and/or pressure sensor installation locations.

Figure 3A:
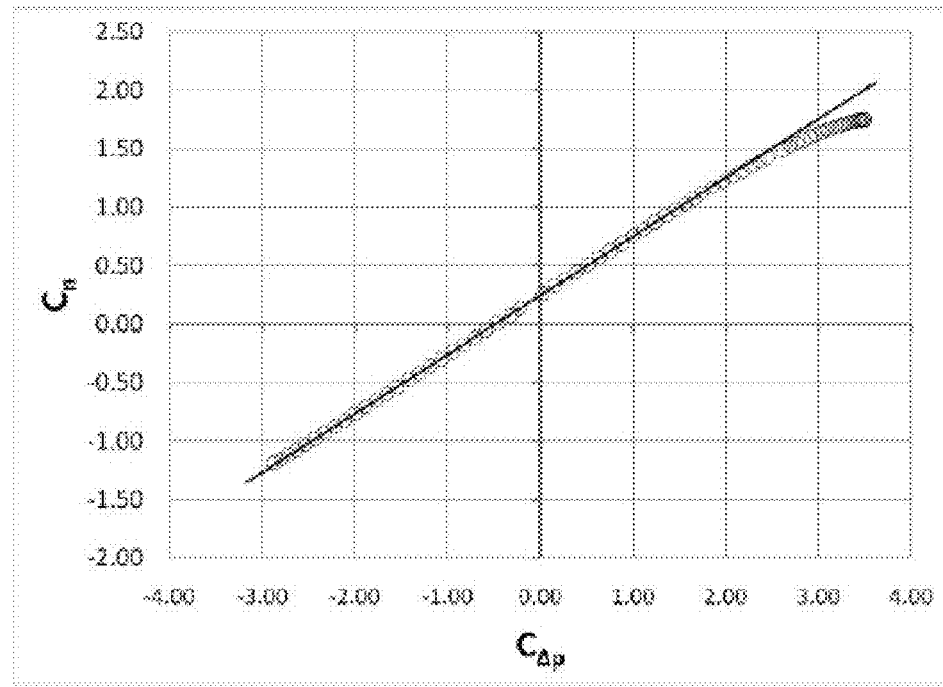
FIG. 3A illustrates a graph depicting a normal force coefficient versus a pressure differential coefficient according to one embodiment of the disclosure.

FIG. 3A illustrates an example linear fit between the pressure differential coefficient ($C_{\Delta p}$) and the normal force coefficient ($C_n$) based on empirical data for a particular type of blade and sensor installation location. For example, simulations and/or tests may be performed on a blade of the particular type and having the pressure sensors located at the sensor installation locations. The results of the tests and/or simulation may then be analyzed to identify a linear relationship between $C_{\Delta p}$ and $C_n$. In some arrangements, best-fit algorithms (e.g., least squares) may be used to compute the relationship between the pressure differential coefficient and each of the other coefficients.

Figure 3B:
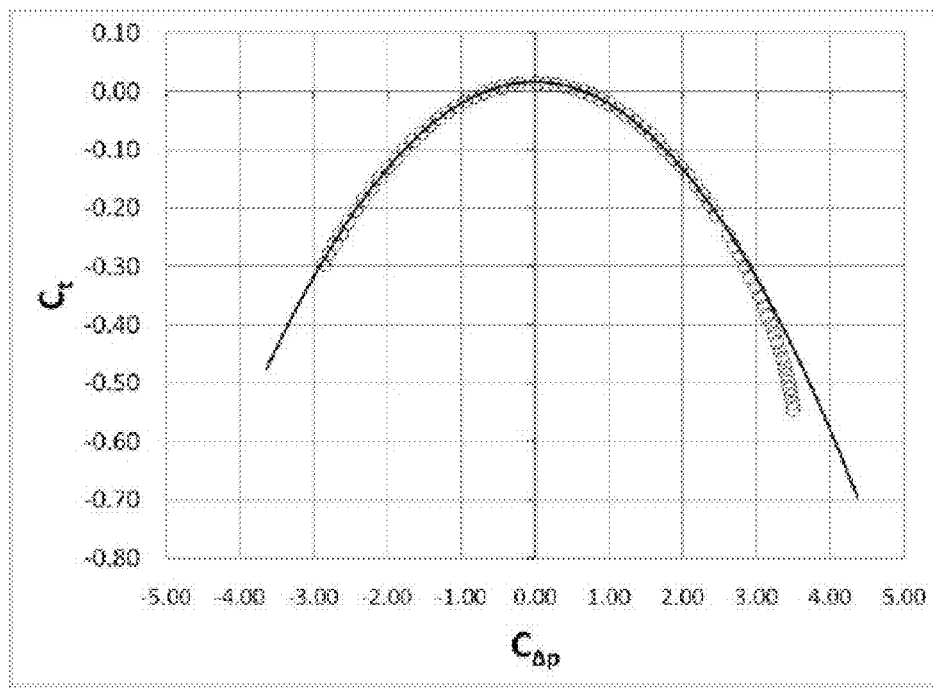
FIG. 3B illustrates a graph depicting a tangential force coefficient versus a pressure differential coefficient according to one embodiment of the disclosure.

Similarly, FIG. 3B illustrates an example quadratic relationship between the pressure differential coefficient ($C_{\Delta p}$) and the tangential force coefficient ($C_t$). Again, data collected through empirical studies and analyses may be used to derive the quadratic relationship for a particular type of blade and/or pressure sensor installation location.

Figure 4:
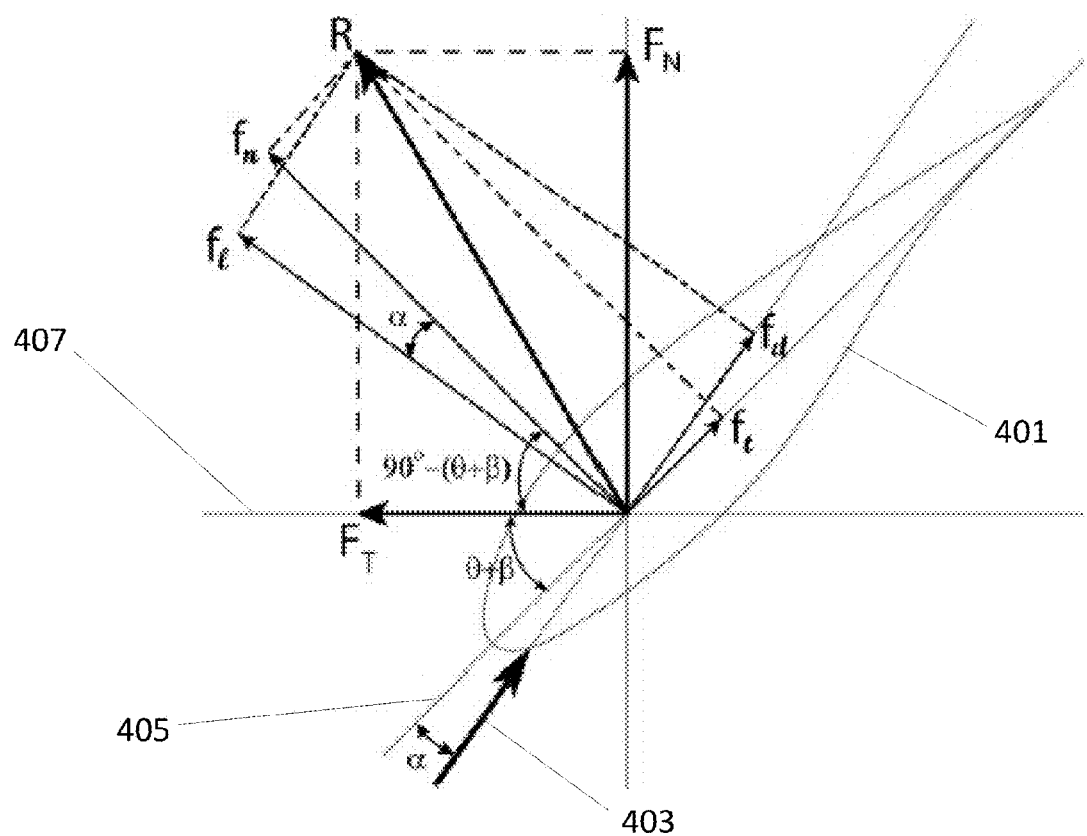
FIG. 4 illustrates exemplary forces acting on an aerodynamic load bearing member according to one embodiment of the disclosure.

FIG. 4 is a diagram illustrating example forces acting upon a rotor blade 401 along with an example wind vector 403. The illustrated forces include the resultant force (R), lift force ($f_l$), drag force ($f_d$), normal force ($f_n$), tangent force ($f_t$), rotor-normal force ($F_N$), and rotor-tangent force ($F_T$). For example, the rotor-normal force $F_N$ is perpendicular to the rotor plane 407 while the normal force $f_n$ is normal to the chord line 405 of the rotor blade 401. The forces normal to the rotor plane 407 may be used to determine root bending moments, which contributes to stress on the blade. Accordingly, controls may be implemented to minimize the root bending moments or to optimize power output. In one example, optimizing power output may include balancing the root bending moment while maximizing in-plane power-producing loads. Modification of bending moments, normal loads, power-producing loads, and other forces may be controlled in a variety of ways including changing blade pitch or yaw, deploying air deflectors, extending/retracting expandable and retractable blades, and the like, as is described in further detail below.

Using the estimated lift force, normal force, and tangent force coefficients (as determined by, e.g., equations 5, 6, and 7 respectively), and the estimated local dynamic pressure (as determined by, e.g., equation 1), the lifting load ($\mathcal{L}$), normal force load ($\eta$), and tangent force load ($\tau$) may be estimated based on the following equations:

$$\mathcal{L} = q_{est} C_{l,est} \quad (8)$$

$$\eta = q_{est} C_{n,est} \quad (9)$$

$$\tau = q_{est} C_{t,est} \quad (10)$$

Equations 8, 9, and 10 estimate aerodynamic loads in the local chord-fixed reference frame. In general, these loads can be translated into other reference frames if the appropriate transformation angles are known. For example, the load normal to the rotor plane may be calculated using the determined normal and tangent force loads of the local chord-fixed reference frame based on the following equation:

$$L_N = \eta \cos(\theta_{sensor} + \beta) + \tau \sin(\theta_{sensor} + \beta) \quad (11)$$

where $\theta_{sensor}$ corresponds to the blade twist angle at the sensor location and $\beta$ corresponds to the blade pitch angle (as discussed). Generally, the top and bottom sensors will be located in corresponding radial positions on a top surface and a bottom surface of the blade. Accordingly, the blade twist angle will be the same. To calculate the normal load in the blade-fixed reference frame, $\beta$ is set to zero.

Similarly, the tangential loads relative to various reference frames may be calculated based on the determined normal and tangent force loads (relative to the local chord-fixed reference frame). For example, the following tangential load equation may be applied:

$$L_T = \eta \sin(\theta_{sensor} + \beta) - \tau \cos(\theta_{sensor} + \beta) \quad (12)$$

Again, the tangential load in the blade-fixed reference frame may be calculated by setting the blade pitch angle $\beta$ to zero.

Figure 5:
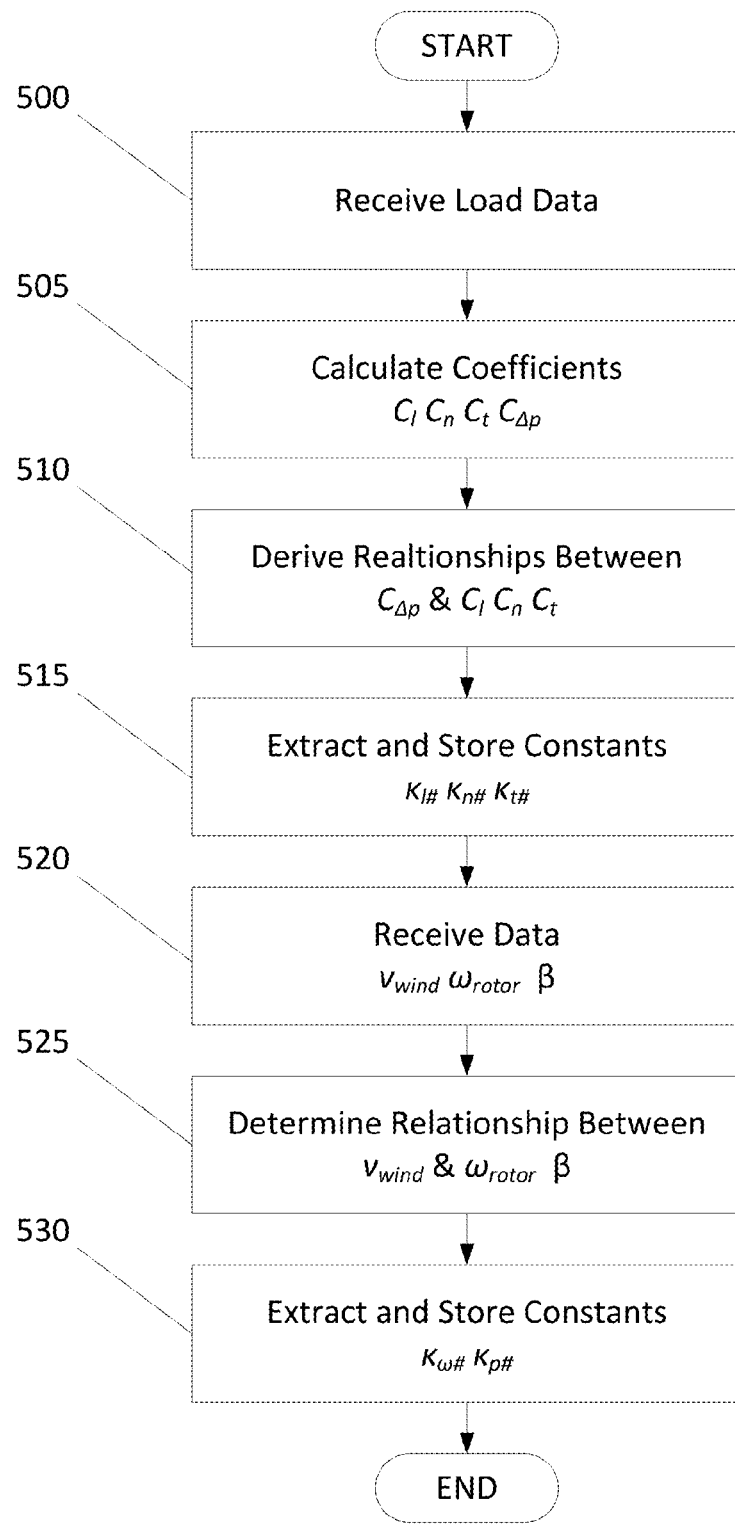
FIG. 5 illustrates a flowchart of a method for determining a relationship between a force coefficient and a pressure differential coefficient as well as a relationship between a rotor speed and/or blade pitch angle and wind velocity according to one embodiment of the disclosure.

FIG. 5 illustrates a flowchart of an example method for empirically determining the relationship between each load coefficient and the pressure differential coefficient, as well as empirically determining the relationship between the rotor speed and/or the blade pitch angle and the wind speed. These empirically determined relationships may later be used when determining loads on a wind turbine blade using a single pressure differential as discussed more fully below.

In step 500, a computing system may collect, receive or otherwise determine load information generated based on empirical tests and analyses (e.g., simulations, field tests, data for turbines in service, etc.). The computing system may comprise a controller for modifying or otherwise setting characteristics of a wind turbine, an airfoil, devices in or on an airfoil, sets of wind turbines and the like and/or combinations thereof. The computing system may correspond to a controller for an air deflector device in one or more examples. Alternatively or additionally, the computing system may correspond to a controller for an entire blade. In yet other examples, the computing system may be configured to control all or a subset of devices within a wind turbine. In still another example, the computing system may be configured to control multiple wind turbines. Using the collected load data, the coefficients of lift force ($C_l$), normal force ($C_n$), tangent force ($C_t$), and pressure differential ($C_{\Delta p}$) may be calculated or otherwise determined in step 505. For example, the pressure differential coefficient may be calculated from the received load information based on the equation:

$$C_{\Delta p} = \frac{p - p_\infty}{q^\infty} \qquad (13)$$

where p is the local pressure measured on the blade surface, $p_\infty$ is the barometric (i.e., ambient air) pressure, and $q_\infty$ is the dynamic pressure. The dynamic pressure may be calculated using the following equation:

$$q_\infty = \tfrac{1}{2} \cdot \rho_\infty \cdot v_\infty^2 \qquad (14)$$

where $\rho_\infty$ is the ambient air density and $v_\infty$ is ambient air speed. The ambient air density may be determined according to the perfect gas law using the ambient air temperature ($T_\infty$) and the gas constant for dry air ($R_{air}$, which has a value of 287 J/(kg K)), according to the following equation:

$$\rho_\infty = \frac{p_\infty}{R_{air} T_\infty} \qquad (15)$$

A coefficient for each force may be calculated from the received load information and the determined dynamic pressure based on the equation:

$$C_F = \frac{F}{A \cdot q_\infty} \qquad (16)$$

where F is the force associated with coefficient being calculated (e.g., lift, normal, tangential, etc.), and A is the nominal area the force is acting upon (defined as $\pi$ times the nominal diameter squared, all divided by four). For example, with respect to the lift, the nominal area the lift force is acting on may be, e.g., the blade planform area.

Upon determining each of these coefficients, relationships may be derived or otherwise determined between the pressure differential coefficient and each of the lift coefficient, the normal force coefficient, and the tangent force coefficient in step 510. As discussed above and illustrated in FIG. 3A and FIG. 3B, the relationship may be, e.g., a linear relationship or a quadratic relationship and may be determined using best fit algorithms such as least squares and the like. In one example, the lift and normal force coefficients may have a linear relationship with the pressure differential coefficient while the tangent force coefficient may have a quadratic relationship with the pressure differential coefficient. In step 515, the constants (e.g., $\kappa_{l\#}$, $\kappa_{n\#}$, and $\kappa_{t\#}$) resulting from the determined relationships may be extracted and stored. For example, the constants may be stored in a storage device in an airfoil, in a turbine, or in a central controller configured to control multiple turbines.

In step 520, the system may further collect (e.g., receive) or otherwise determine measured wind velocity data ($v_{wind}$), detected rotor speed information ($\omega_{rotor}$), and blade pitch angle ($\beta$). This information may be measured, in some examples, during empirical tests and/or simulations. Using the collected data, the system may, in step 525, determine (e.g., calculate) relationships between the wind velocity data and one or more of the rotor speed and the blade pitch angle. For example, a first relationship may be defined for a minimum blade pitch angle ($\beta_{min}$) of the rotor blade while a second relationship may be determined for blade pitch angles above the minimum blade pitch angle. Examples of the various relationships are shown in equation set 3. These relationships (between wind velocity and rotor speed and/or blade pitch angle), as with the pressure differential coefficient relationships, may be determined using empirical data and best fit algorithms such as a least squares. Once the relationships have been determined, the constants for the wind velocity relationships may then be extracted and stored in step 530 for subsequent use.

By identifying the various relationships between load coefficients and pressure differential coefficients, and between rotor speed and blade pitch angles and wind speed, a turbine control system may appropriately modify blade and turbine characteristics in response to compensate for or otherwise address various loads and load conditions. In one example, a turbine control system may modify blade or turbine characteristics such as deployment/retraction of air deflectors on a blade, extension/retraction of a tip portion of a blade, modifying pitch and/or yaw angles, and the like. In some instances, the turbine control system may modify blade characteristics to optimize the lift-to-drag ratio, as described in further detail below.

Figure 6:
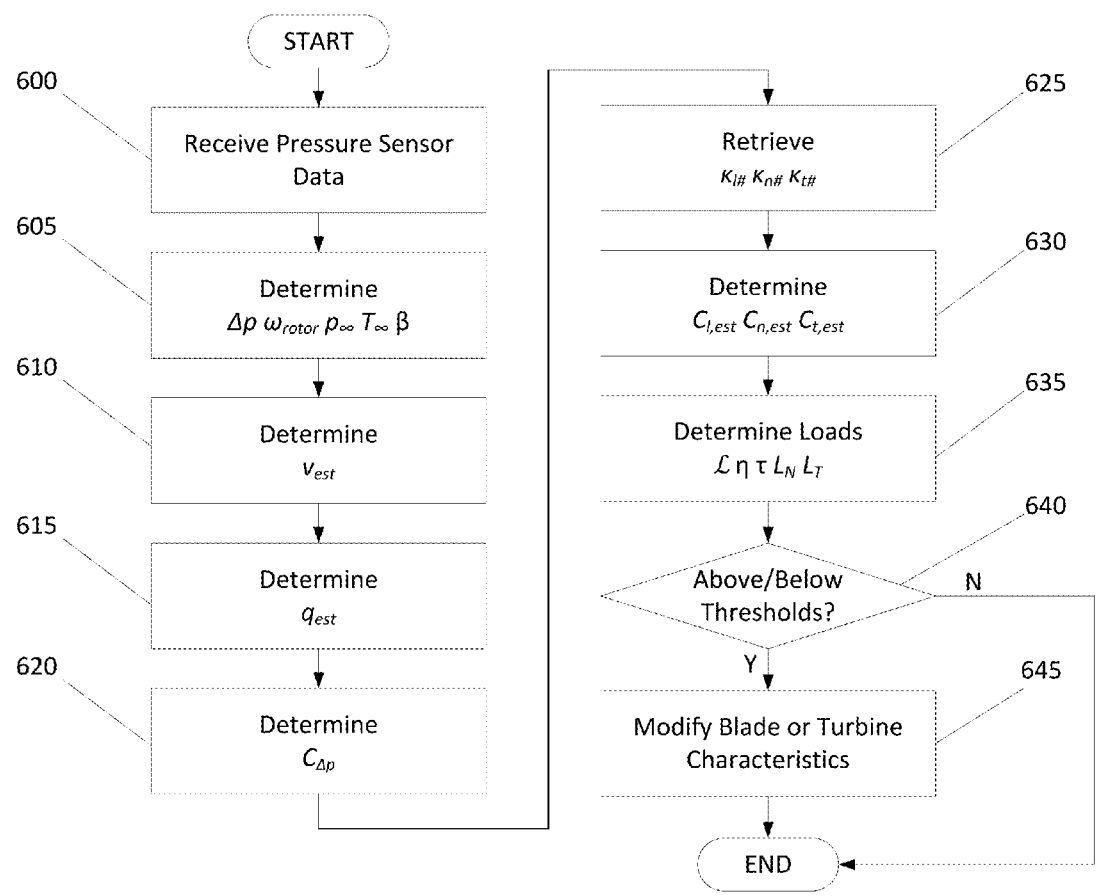
FIG. 6 illustrates a flowchart of a method for controlling one or more airfoil characteristics in response to determining loads acting on the airfoil according to one embodiment of the disclosure.

FIG. 6 illustrates an example method for controlling one or more blade and turbine characteristics based on load determinations, such as those made according to aspects described herein (e.g., using a single pressure differential). One or more control systems may be used to control the blade and/or turbine characteristics. The control system(s) may be located in the blade, in the turbine, or in a control room remote from the turbine. The control system may also be configured to control a single device (e.g., a single air deflector, single rotor blade, single turbine) or multiple devices (e.g., multiple air deflectors, multiple rotor blades, multiple turbines). In step 600, the control system may receive or determine pressure sensor data from a pair of pressure orifices on a blade while the turbine is in operation. In one example, the data may be provided wirelessly or through wired connections and/or using one or more public or private networks. In step 605, the control system may determine the pressure differential ($\Delta p$) between the pressure sensor readings from the two pressure sensing orifices (e.g., $P_1$ and $P_2$ in FIG. 2), a rotor speed ($\omega_{rotor}$), barometric (i.e., ambient air) pressure ($p_\infty$), ambient air temperature ($T_\infty$), and a blade pitch angle (e.g., positive toward feather, $\beta$). In various arrangements, the control system may determine at least two of a rotor speed ($\omega_{rotor}$), barometric (i.e., ambient air) pressure ($p_\infty$), ambient air temperature ($T_\infty$), and a blade pitch angle (e.g., positive toward feather, $\beta$). In other examples, the control system might only determine one of the aforementioned characteristics.

In step 610, the control system may determine the local air speed ($v_{est}$). The local air speed, as shown in equation 2, may be determined based on one or more of the estimated wind speed ($v_{wind,est}$) the rotor speed, and the radial location of the sensors ($r_{sensor}$), and/or combinations thereof. In some arrangements, the location of the sensor may be predefined and pre-stored (e.g., determined at the time of installation into the blade). The estimated wind speed, in turn, may be calculated based on the rotor speed and/or the blade pitch angle as shown in equation set 3. In a particular example, the control system may determine whether the blade pitch angle is above a predefined minimum blade pitch angle ($\beta_{min}$), as noted above. If so, a first determination algorithm or formula may be used to generate the estimated wind speed. If, however, the blade pitch angle is equal to the minimum, the control system may apply a second algorithm or formula to generate the estimated wind speed.

Using the local air speed, the control system may determine the local dynamic pressure in step 615 according to, for example, equation 1 shown above. The ambient air density ($\rho_\infty$) may be calculated based on the perfect gas law using the barometric (i.e., ambient air) pressure ($p_\infty$), the gas constant for dry air ($R_{air}$), and the ambient air temperature ($T_\infty$) according to equation 15. Using the pressure differential received in step 600 and the local dynamic pressure determined in step 615, the pressure differential coefficient may then be calculated by the control system in step 620. For example, an estimated pressure differential coefficient may be determined using equation 4. In steps 625-635, the determined pressure differential coefficient may then be used to determine the desired loads. Specifically, at step 625 the control system may retrieve the determined constants for each of the various load coefficient to pressure differential coefficient relationships determined, extracted and stored in step 515 of the flowchart in FIG. 5. Using the retrieved constants and the type of coefficient-to-coefficient relationship, in step 630 the control system may then estimate each of the lift, normal, and tangent load coefficients based on, e.g., equations 5, 6, and 7, respectively. The loads may then be derived based on each of the coefficients and the local dynamic pressure in step 635. For example, the lift load ($\mathcal{L}$) may be calculated by multiplying the local dynamic pressure with the lift load coefficient as presented equation 8. Similarly, the normal force load ($\eta$) and the tangent force load ($\tau$) may be determined by multiplying the local dynamic pressure with the normal force load coefficient and the tangent force load, respectively, as presented in equations 9 and 10. The rotor-normal load ($L_N$) and rotor-tangent load ($L_T$) may also be calculated using, for example, equations 11 and 12, respectively.

Once the loads have been determined, the control system may compare one or more of the loads to specified load thresholds to determine if the loads exceed, meet, or fall below the thresholds in step 640. Depending on the results of the comparison, the control system may modify one or more blade or turbine characteristics in step 645. For example, if the rotor-normal load exceeds a specified threshold, the control system may deploy one or more air deflectors on the blade to reduce stress and strain on the blade. In another example, if the rotor-tangent load falls below a specified threshold, the control system may modify a blade pitch to increase the rotor-tangent load (e.g., to increase power production). In other examples, controls may be based on a combination of loads such as both the rotor-normal load and the rotor-tangent load. In particular, the control system may modify blade and turbine characteristics to optimize the ratio between the rotor-tangent load and the rotor-normal load.

According to some arrangements, the estimated load profile and various coefficients used to determine a load based on a single pressure differential reading (e.g., normal, tangential, and lift force coefficients described above), may change depending on the blade or turbine characteristics. For example, different coefficients and/or linear or quadratic correlations may be defined for different sets of blade or turbine characteristics. In a particular example, a first correlation/relationship may be defined and used to determine load if a first set of one or more air deflectors are deployed while a second correlation/relationship may be defined and used if a second set of one or more air deflectors are deployed (or if no air deflectors are deployed). Similarly, different pitches or yaws (or combinations thereof) may also affect the correlation/relationship defined and used to determine the load. Accordingly, a control system may store a variety of different load determination equations/relationships and automatically select the appropriate relationship depending on the currently existing blade and/or turbine characteristics when the load is to be determined.

Selecting the equation/relationship to be used in load determination may be performed based on minimizing an estimated amount of error. For example, if an equation or relationship is not defined for a current set of parameters of the turbine (e.g., the particular deflector(s) activated, the pitch or yaw angle, and/or combinations thereof), a control system may select a relationship for another set of turbine parameters that would result in the smallest estimated amount of error for the current set of turbine parameters. Error in using a relationship defined for a first set of turbine parameters to calculate load for a second set of turbine parameters may be estimated using a variety of methods, including empirical testing.

Using load determination techniques such as those described herein, a turbine control system may further perform blade balancing and/or optimization. In one example, one or more blades of the turbine may be adjusted to balance detected loads among all of the blades. Accordingly, if one blade is experiencing higher loads than other blades, one or more characteristics of the one blade may be adjusted to bring the load down to the level detected by the other blades. For example, a pitch or yaw of the higher-load blade may be adjusted and/or air deflectors on the higher-load blade may be deployed. In other examples, if the blade is a variable length blade, a tip portion may be extended or retracted to modify effective loads. Individual or groups of blades (e.g., less than all blades, predefined sub-groups of blades, etc.) may be controlled separately from the other blades.

Determined loads may also be used to optimize various characteristics of the turbine's operation. For example, the lift-to-drag ratio of one or more blades may be optimized to maximize power generation. Thus, in a particular example, a blade's pitch may be modified to increase the lift-to-drag ratio, thereby increasing power generation. Again, as with blade balancing, each individual blade may be controlled separately from the other blades. Additionally or alternatively, sub-groups of blades may be defined and controlled together separately from other blades or sub-groups of blades. Turbine control may also include evaluation of slices of the blade path. Accordingly, if a slice of the blade path is determined to be experiencing a higher load than other portions of the blade path, a control system may modify, e.g., the yaw of the turbine to compensate and equalize the loads.

Balancing and optimization of turbine operation may be performed on the fly or during a turbine down state. Accordingly, a turbine may be controlled continuously, at predefined times, or upon detection of a condition (e.g., lift-to-drag is below a specified threshold) during operation to insure that power generation is maximized and/or other objectives are met. The ability to balance and modify blade characteristics after installation eliminates the need to remove blades or disassemble other parts of the turbine in order to performance balancing and other adjustments.

Figure 7:
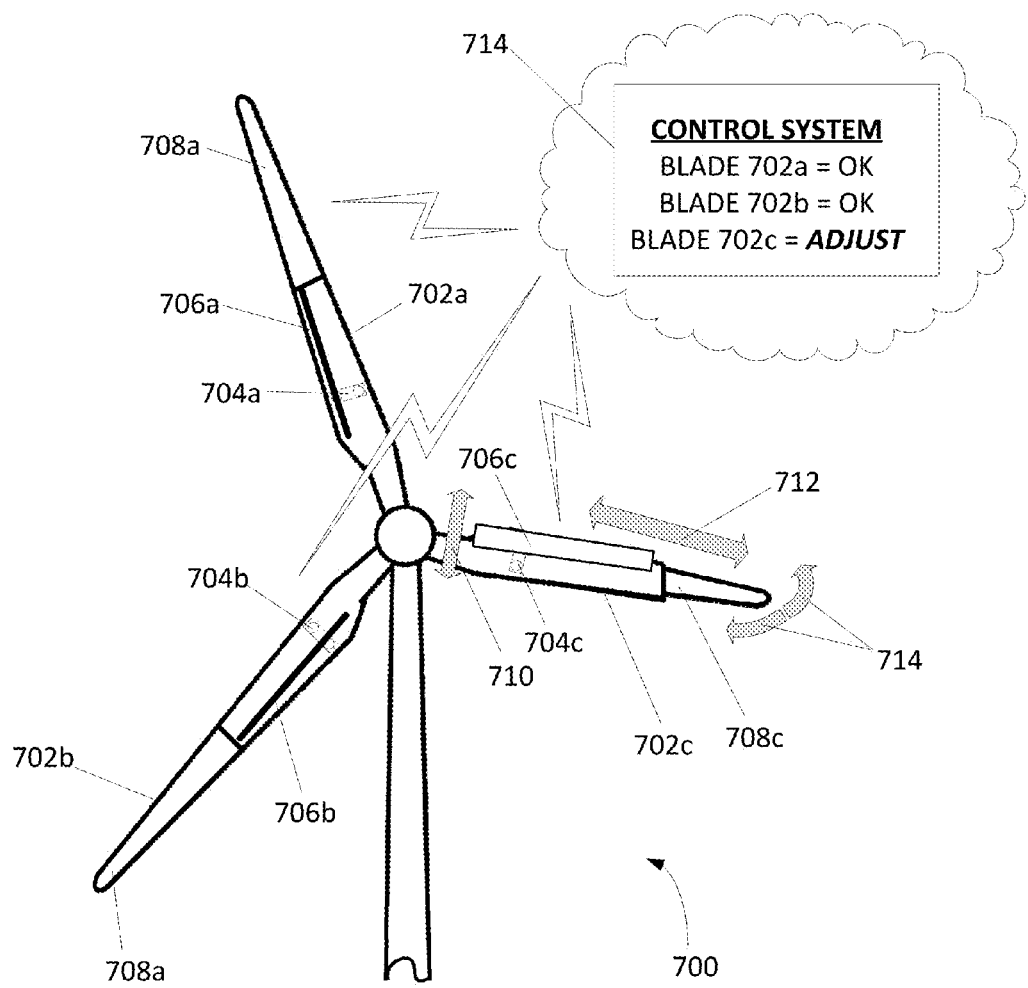
FIG. 7 illustrates modifying one or more characteristics of a wind turbine blade according to one embodiment of the disclosure.

FIG. 7 illustrates one embodiment wherein a turbine control system performs blade balancing and/or optimization. Specifically, FIG. 7 illustrates wind turbine 700 comprising three blades, 702a, 702b, and 702c. Blades 702a, 702b, and 702c comprise pressure sensors 704a, 704b, and 704c, respectively. Each pressure sensor 704 may comprise two orifices ($P_1$ and $P_2$) and transducer 30 as illustrated in FIG. 2. A pressure differential can thus be measured at each blade 702 by each pressure sensor 704. Each blade 702 may further comprise various controls, systems, and the like which may vary different characteristics of the blade 702 in order to bring loads acting on each blade to a desired level. For example, each blade may comprise an air deflector 706, which may be deployed or refracted, or tip portion 708, which may be extended or retracted. Further, each blade 702 may be configured such that the pitch and/or yaw of the blade may be adjusted in response to detected loads.

In the embodiment depicted in FIG. 7, blade 702c is adjusted in response to turbine control system 714 sensing that the loads acting blade 702c are out of balance with those acting on each of the other two blades, 702a and 702b, and/or are not within a predetermined range of acceptable loads. Specifically, turbine control system 714 receives pressure differential readings from each of pressure sensors 704a, 704b, and 704c. Using, e.g., any of the load determination techniques as described above, turbine control system 714 determines that blade 702c needs adjustment in order to bring loads into acceptable load ranges and/or balance the loads with those associated with blades 702a and 702b. Accordingly, turbine control system 714 may adjust one or more characteristic of blade 702c. For example, turbine control system 714 may deploy air deflector 706c, as illustrated by arrow 710. Alternatively or additionally, turbine control system 714 may extend or retract tip portion 708c as shown illustrated by arrow 712, and/or turbine control system 714 may alter the pitch or yaw of blade 702c as illustrated by arrows 714.

By receiving a pressure differential reading from each blade 702 of a wind turbine 700, turbine control system 714 may thus determine loads associated with each blade and make adjustments to the characteristics of each blade if necessary to bring the effective loads within a predetermined acceptable range and/or balance the loads among each blade. In the embodiment illustrated in FIG. 7, only blade 702c is shown as receiving adjustment, however, as will be well understood given the benefit of this disclosure, more than one blade and/or more than one characteristic of each blade may be adjusted in order to balance and/or optimize loads among each blade. For example, in another embodiment, in response to receiving pressure differential readings from each blade, turbine control system 714 may deploy the air deflector 706c of blade 702c, adjust the pitch of blade 702a, and extend or retract tip portion 708b of blade 702b. Any other combination of adjusting characteristics among each blade to achieve a desired load distribution may be readily employed without departing from the scope of this disclosure.

Figure 8:
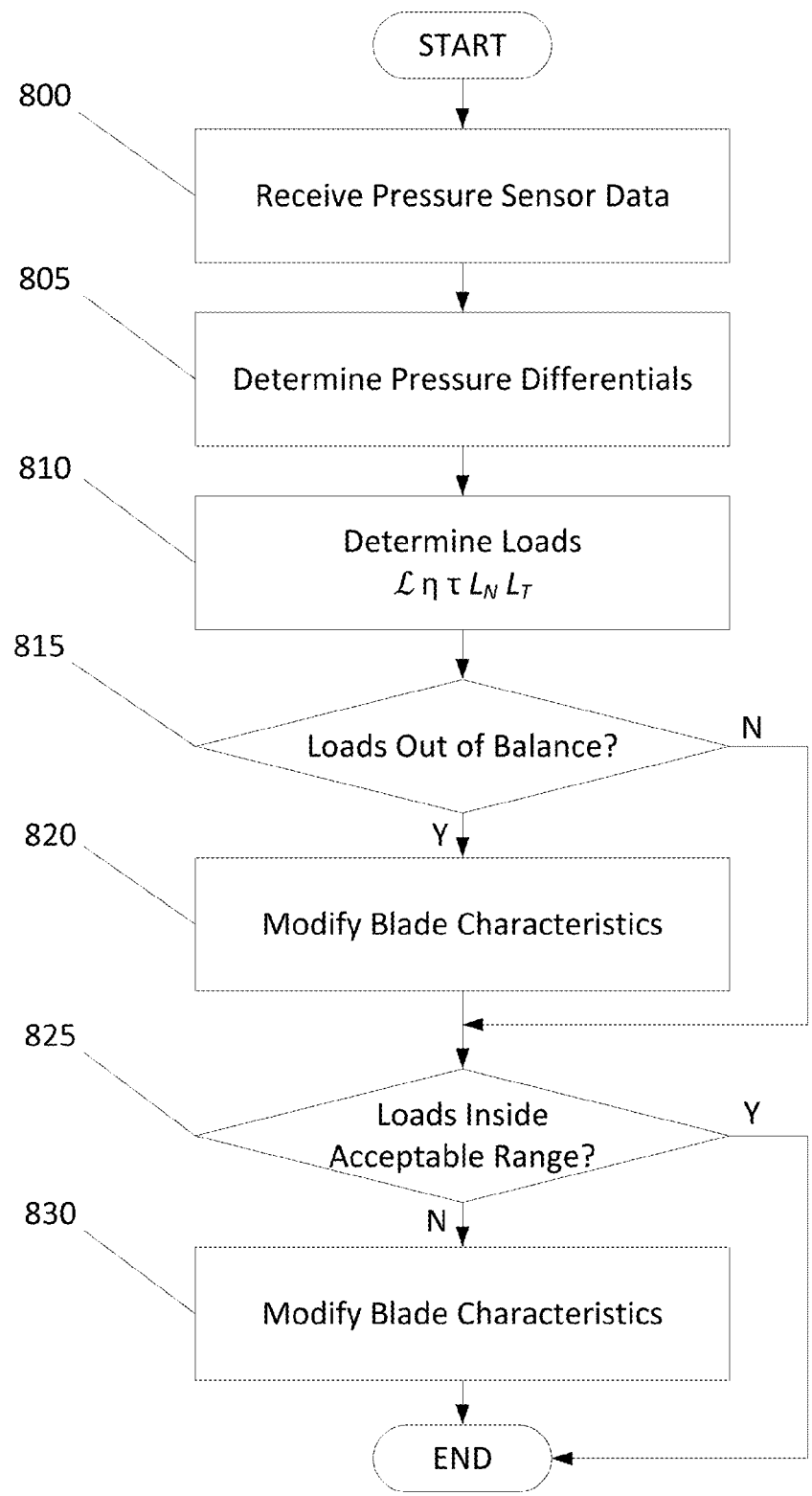
FIG. 8 illustrates a flowchart for a method of balancing blades and/or optimizing loads on a wind turbine according to one embodiment of the disclosure.

FIG. 8 illustrates a flowchart of an example method for optimizing and/or balancing blades of a wind turbine. At step 800, pressure sensor data is determined by a control system. Pressure sensor data may be determined (e.g., received, calculated, measured, etc.) from a plurality of pressure sensors on a plurality of blades. For example, returning to FIG. 7, pressure sensor data may be received from pressure sensors 704a, 704b, and 704c on blades 702a, 702b, and 702c, respectively. At step 805, pressure differentials may be determined from the received pressure sensor data. For example, each pressure sensor 704 may include a pressure orifice on the bottom surface of a blade and a pressure sensor orifice on a top surface of a blade (such as $P_1$ and $P_2$ in FIG. 2). The system, at step 805 may thus determine a difference in pressure between these two orifices which, as presented above, may be proportional to loads the blade is experiencing.

At step 810, these loads may be determined using, e.g., any of the aforementioned methods. In some embodiments, other characteristics in addition to pressure differential may be used to determine loads. For example, the system may use one or more of the rotor speed of the wind turbine, barometric (i.e., ambient air) pressure, ambient air temperature, a sensor radial location, a twist angle of the wind turbine blade, and/or a pitch angle of the wind turbine blade in determining loads acting on the blade. At step 815, the system may determine whether the loads are out of balance. For example, in one embodiment the loads experienced by a first of the wind turbine blades may be compared to the loads experienced by other wind turbine blades. If the loads experienced by the first blade are out of balance with the loads experienced by other blades, the method may proceed to step 820. If, however, the loads are not out of balance, the system may proceed to step 825. At step 820, characteristics of the blade are modified in order to bring the load acting a first blade back in balance. For example, if the blade is equipped with a deployable air deflector, the method may deploy the air deflector. Additionally or alternatively, the method may change the pitch angle of the blade or the yaw angle of the turbine and/or blade to balance the loads. Or the method may extend or retract a tip portion of the blade. Any modification at this step may be made in "real time;" i.e., while the wind turbine is rotating or during a turbine down state. Accordingly, the method may bring blades into balance while the wind turbine is operating to avoid, e.g., downtime and lost productivity.

The system may also determine whether determined loads are within an acceptable range at step 825. For example, the system may determine loads acting on a blade are too high, and accordingly modify, e.g., any of the abovementioned characteristics in response at step 830 in order to avoid damage to the blade. Alternatively or additionally, the system may determine that, e.g., a lift-to-drag ratio is too low and modify any of the abovementioned characteristics at step 830 in order to increase power generation. Again, any modification at step 830 may be made in "real time;" to avoid, e.g., downtime and lost productivity, or during a turbine down state.

In some embodiments of the disclosure, using any of load estimation techniques as described above, a load profile may be determined or estimated along the length of an airfoil or a blade. For example, the load estimation techniques as described above may be used to determine, e.g., a rotor-normal and/or rotor-tangent loads at multiple locations along an airfoil or blade. Using the estimated loads at multiple locations, a load distribution may be determined. This load distribution may be used to when deriving additional metrics about the airfoil or blade. For example, a load distribution may be used to determine a root bending moment acting on an airfoil or blade. If the root bending moment is too high, a control system may alter one or more characteristics to reduce the moment and thus avoid damage to the rotor and/or the blades. Conversely, if the root bending moment is too low, a control system may alter one or more characteristics to increase the moment in order to, e.g., increase power generation. Alternatively, a load distribution may be used to derive the displacement (e.g., the flex or twist) of an airfoil or blade. Or, a load distribution may be used to determine velocities and accelerations associated with an airfoil or blade. Accordingly, using, e.g., any of the aforementioned techniques, a control system for a wind turbine may derive many useful metrics used in the control of the wind turbine by merely estimating loads associated with at least one blade of the turbine.

Figure 9:
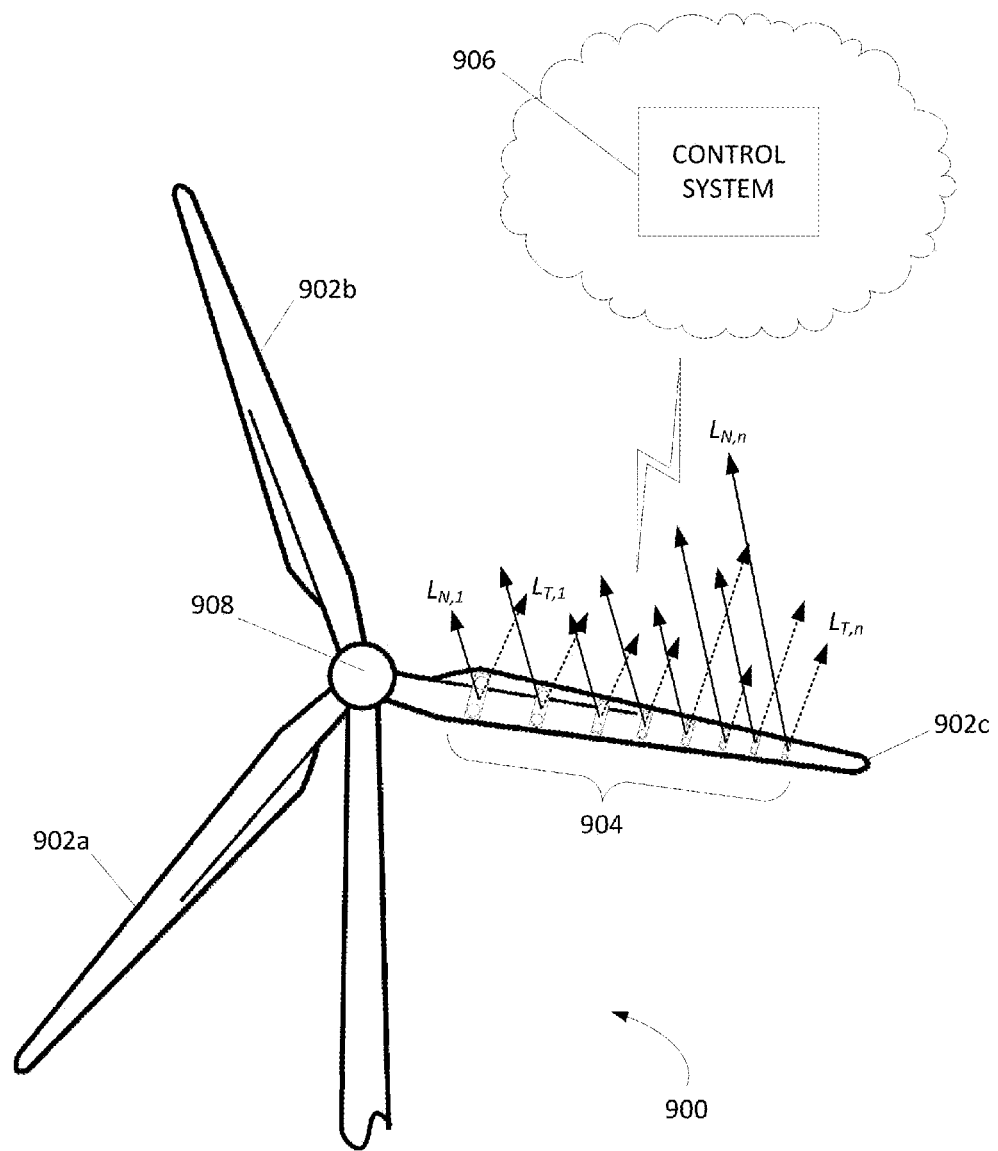
FIG. 9 illustrates an control system determining a load distribution on an airfoil according to one embodiment of the disclosure.

FIG. 9 illustrates an example of control system 906 determining a load distribution on blade 902c of a wind turbine. In FIG. 9, wind turbine 900 comprises a hub 908 and three blades, 902a, 902b, and 902c. Blade 902c is equipped with a plurality of pressure sensors 904. In the embodiment depicted, only blade 902c is shown having pressure sensors 904 for simplicity, however, in some embodiments more than one blade may comprise one or more pressure sensors. Pressure sensors 904 may comprise, e.g., two pressure sensing orifices ($P_1$ and $P_2$) and a transducer 30 as depicted in FIG. 2. Accordingly, control system 906 may receive data corresponding to multiple pressure differentials along the length of blade 902c. Specifically, each pressure sensor $904_n$ may determine a pressure at $P_{1,n}$ (i.e., a bottom surface of blade 902c) and a pressure at $P_{2,n}$ (i.e., a top surface of blade 902c) and determine a pressure differential between the two locations. Thus, for each radial location along blade 902c where each pressure sensor $904_n$, is located, control system 906 may receive data regarding a difference in pressure on the top of blade 902c and the bottom of blade 902c. Control system 906 may then use the received pressure differential at each location to estimate a load distribution along blade 902c using, e.g., any of the load estimation techniques described herein.

For example, as depicted in FIG. 9, control system 906 is depicted as estimating the rotor-normal load ($L_N$) and tangential load ($L_T$) at each radial location. In other embodiments, control system 906 may estimate, e.g., the lifting load ($\mathcal{L}$), the normal load ($\eta$), the tangential load ($\tau$), and/or any other desired loads. Once any desired loads are determined, control system 906 determines a load distribution along blade 902c and may further use the load distribution to determine other metrics associated with wind turbine 900. For example, control system 906 may use the load distribution to determine a displacement of blade 902c, including an amount of flex or twist of blade 902c. Alternatively, control system 906 may determine an acceleration or velocity of blade 902c and/or wind turbine 900 accordingly to the load distribution. By measuring pressure differentials along the radial length of blade 902c, a control system 906 may thus estimate a load distribution and derive other relevant metrics accordingly.

The magnitude of each estimated load $L_{N,n}$ and $L_{T,n}$ as depicted in FIG. 9 is for illustrative purposes only. In other embodiments, the forces estimated at each location along blade 902c may have, e.g., a linear or quadratic relationship. For example, in one embodiment, the rotor-normal load may be linearly proportional to the radial distance of pressure sensor $904_n$ from the hub 908. Thus, the rotor-normal load may increase proportionally to the radial length from hub 908, and accordingly the load distribution would appear more uniform that those depicted in FIG. 9. Alternatively, control system 906 may, e.g., strive to achieve a linear and/or quadratic relationship among the loads along the length of blade 902c. Thus, upon estimating the loads along the length of blade 902c, controller 906 may determine that the loads are not proportional to the corresponding pressure sensor $904_n$ radial distance from hub 908 (i.e., the loads are out-of-balance). Accordingly, controller 906 may adjust one or more characteristics of blade 902c as discussed herein in order to bring the loads back into balance.

Figure 10A:
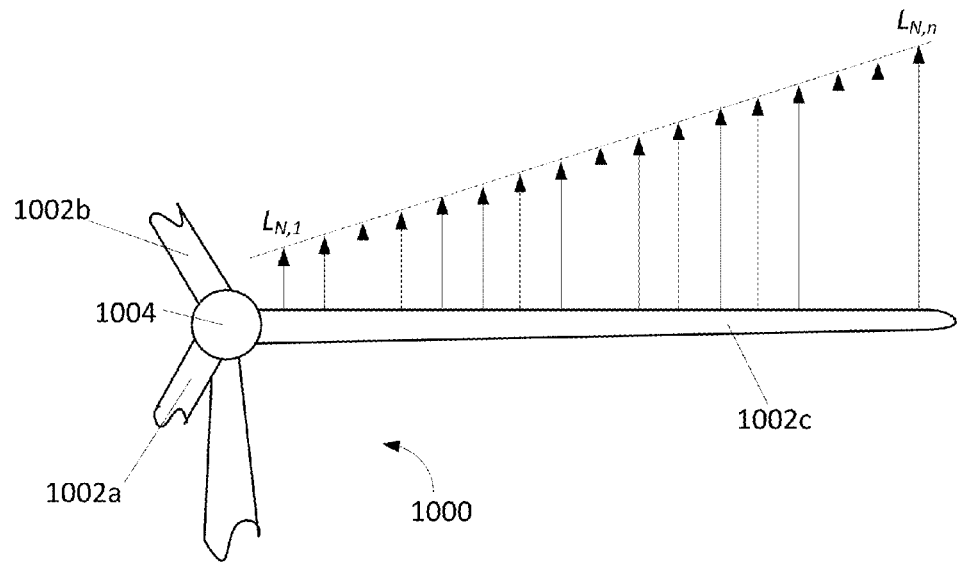
FIG. 10A illustrates an example load distribution on a wind turbine blade according to one embodiment of the disclosure.
Figure 10B:
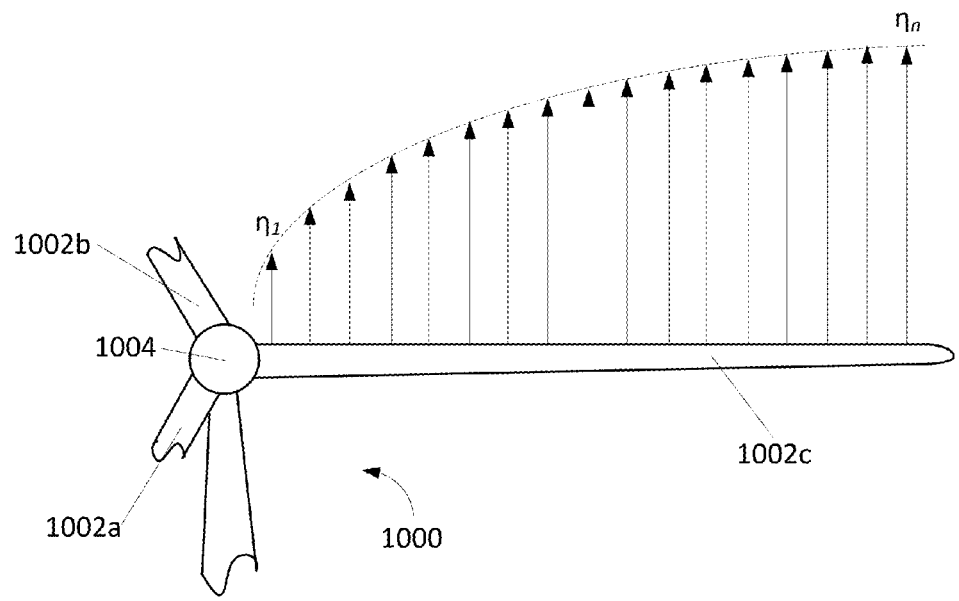
FIG. 10B illustrates another example load distribution on a wind turbine blade according to one embodiment of the disclosure.

FIGS. 10A and 10B illustrate two example embodiments of a balanced load distribution along a wind turbine blade. In FIG. 10A, wind turbine 1000 comprises three blades 1002a, 1002b, and 1002c. For simplicity, blades 1002a and 1002b have not been fully illustrated. Blade 1002c may be equipped with pressure sensors along its length (not shown) such as the pressure sensor described above with respect to FIG. 2 and/or pressure sensors 904 described above with respect to FIG. 9. Each pressure sensor along the length of blade 1002c measures a pressure differential at its location, wherein the pressure differential corresponds to a difference in pressure between a top surface of blade 1002c and a bottom surface of blade 1002c. Using, e.g., any of the load distribution techniques discussed herein, a control system (not shown) may estimate the loads along the length of blade 1002c. For example, as illustrated, a control system may calculate the rotor-normal load ($L_N$) at each location. Alternatively or additionally, a control system may estimate any load discussed herein. In this embodiment, the rotor-normal load distribution is linear. Thus, the controller may determine the blade is in balance. Additionally or alternatively, the control system may use the linear distribution to calculate other metrics corresponding to blade 1002c, such as, e.g., displacement, acceleration, velocity, and/or moment. Using these metrics the controller may more efficiently control the wind turbine by, e.g., modifying characteristics of the wind turbine blade 1002c in order to bring the loads into a desired range and/or balance the loads with loads acting on other blades (e.g., 1002a and/or 1002b).

FIG. 10B represents an alternative load distribution which may be estimated by the control system and/or which the control system may adjust characteristics of the blade in order to achieve. In the embodiment illustrated in FIG. 10B, the load distribution is no longer linear, but rather may have, e.g., a quadratic or other nonlinear relationship. The load distribution may vary depending on, e.g., configuration of the wind turbine, environmental conditions, and/or other factors. Regardless of the actual characteristics of the load distribution, a control system may use the load distribution in determining other metrics of the blade or wind turbine and/or adjust blade characteristics in order to achieve a desired distribution.

The determined load value at discrete points along a rotor blade, as illustrated in FIGS. 10A and 10B, may be used to calculate a distribution. For example, a linear or quadratic fit may be determined to generate an equation corresponding to the distribution. Using this distribution, load values at other points (e.g., points where a pressure sensor or other sensing device is not located) may be calculated or otherwise determined.

In other embodiments of the present disclosure, one or more wind turbines may comprise a distributive control system. In one embodiment of the distributed control system, a wind turbine may comprise multiple communicatively coupled controllers. For example, a wind turbine may have a function-specific controller for each modifiable characteristic of a wind turbine blade. A wind turbine may thus comprise one controller which controls an extendable tip portion of a wind turbine blade, one controller which controls a pitch of the wind turbine blade, one controller which controls a yaw of the wind turbine and/or the wind turbine blade, one controller which controls an air deflector on the wind turbine blade, and/or one or more controllers which controls one or more additional characteristics of the wind turbine blade. Additionally, the wind turbine may comprise a central controller capable of controlling one or more of the above-mentioned characteristics. In such embodiments, each function-specific controller may act as a failsafe or substitute for the central controller, and/or the central controller may act as a failsafe or substitute for each function-specific controller. For example, with respect to an air deflector, a central controller as well as an air-deflector controller may be configured to control the operation of the air deflector. If, for example, the central controller fails, the air-deflector controller may control the air deflector if and when a wind turbine blade needs adjusted. Alternatively, if the air-deflector controller fails, the central controller may control the air deflector if and when the wind turbine blade needs adjusted. Accordingly, a wind turbine may avoid damage and/or shutdown if a controller fails because another controller may perform a substitute operation.

Figure 11:
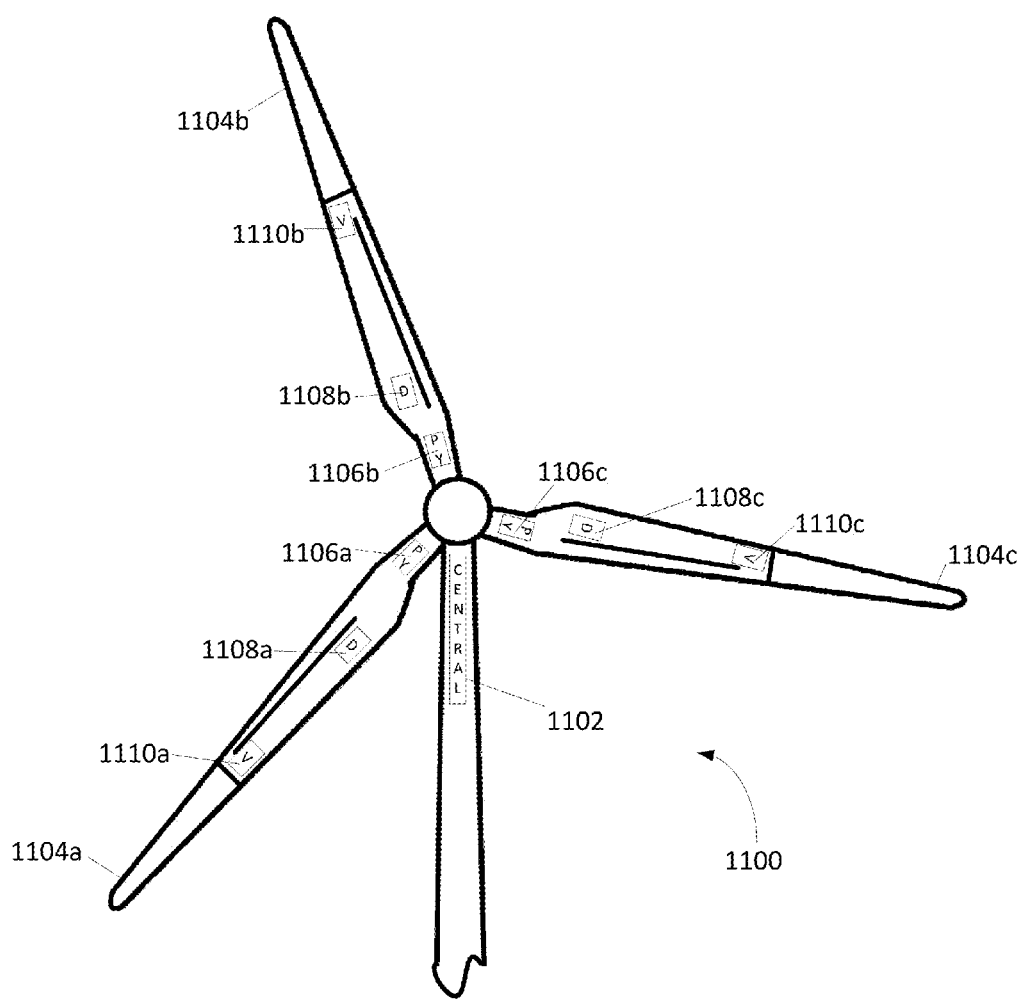
FIG. 11 illustrates an example wind turbine comprising multiple controllers according to one embodiment of the disclosure.

FIG. 11 illustrates one embodiment of a distributive control system using multiple controllers. In FIG. 11, wind turbine 1100 comprises three blades, 1104a, 1104b, and 1104c. Each blade 1104 and/or wind turbine 1100 may be configured such that a number of characteristics may be altered in response to, e.g., detection of excessive and/or out-of-balance loads. For example, each blade 1104 may have a tip portion which is configured to extend or detract. Further, each blade 1104 may have an air deflector which can be deployed or refracted. Still further, each blade 1104 may be configured such that the pitch or yaw of each blade may be altered in order to modify the loads acting on the blade 1104. Wind turbine 1100 may comprise a central controller 1102 which is configured to modify one or more characteristic of wind turbine 1100 and/or blades 1104. For example, central controller 1102 may be configured to modify one or more of pitch angle and yaw angle for each blade 1104, and/or may be configured to extend or retract one or more of an air deflector and/or a tip portion of each blade 1104.

In addition to central controller 1102, wind turbine 1100 may further comprise function-specific controllers configured to modify various characteristics of wind turbine 1100 and/or blades 1104. Specifically, each blade may comprise a pitch and/or yaw controller 1106, air deflector controller 1108, and/or variable length controller 1110. Accordingly, each characteristic of blades 1104 may be modified using the function-specific controllers. Further, each function-specific controller may be redundant with, e.g., central controller 1102. For example, central controller 1102 as well as variable length controller 1110 may be configured to modify the length of one or more blades 1104 in order to modify loads and/or bring loads in balance. Accordingly, when modifying the length of blades 1104, either central controller 1102 or variable-length controller 1110 may be used. If one of the controllers should fail, the other controller may still perform the desired modification in response to excessive and/or out-of-balance loads. Accordingly, each controller provides a failsafe, because characteristics of wind turbine 1100 may be modified in order to, e.g., avoid damage even if one or more controllers fails.

In another embodiment of a distributed control system, multiple controllers among multiple wind turbines may be communicatively coupled in order to provide efficient operation and/or avoid damage due to excessive loads. For example, in one embodiment, multiple wind turbines may be arranged near each other. Each wind turbine may comprise one or more controllers configured to modify one or more characteristics of each wind turbine. For example, each turbine may comprise one or more controllers which extend or retract a tip portion of its blades, modify a pitch angle of its blades, modify a yaw angle of the wind turbine and/or its blades, and/or deploy or retract air deflectors on its blades. The controllers may communicate with each other and adjust characteristics accordingly. By way of example, a controller at a first wind turbine may detect excessive loads at the turbine using, e.g., any of the aforementioned load estimation techniques. The first wind turbine may then adjust any number of characteristics in order to prevent, e.g., damage to the turbine caused by the excessive loads. Additionally, one or more controllers at the wind turbine may then communicate with one or more controllers located at other wind turbines. Accordingly, the controllers at the other wind turbine may adjust one or more characteristics in response to the first wind turbine's load determination. Thus, damage can be reduced in the other turbines and/or the other turbines may be operated more efficiently.

Figure 12:
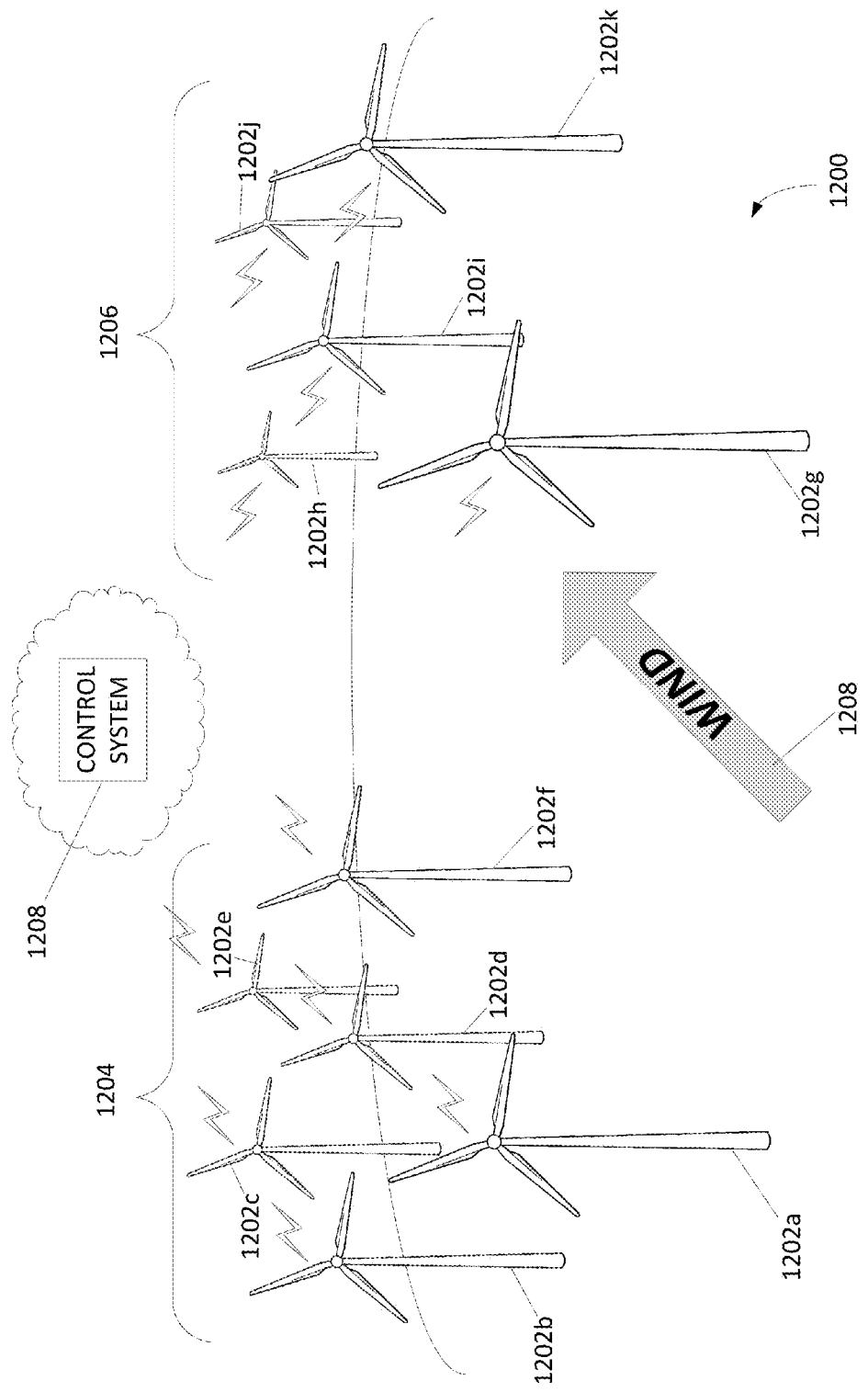
FIG. 12 illustrates an example system of multiple wind turbines with multiple controllers according to one embodiment of the disclosure.

FIG. 12 illustrates one embodiment wherein multiple controllers are communicatively coupled in order to provide a distributed control system among multiple wind turbines. Specifically, wind farm 1200 comprises multiple wind turbines 1202 communicatively coupled to each other through control system 1208. Each wind turbine 1202 may communicate with one another using any well-known method including wired or wireless communication. Characteristics of each wind turbine 1202 (e.g., pitch, yaw, length of blades, air deflectors deployed or not) are configured to be modified in response to, e.g., a determination that loads acting on each turbine 1202 are excessive and/or out of balance. Methods for estimating loads and/or modifying one or more characteristics may be performed by, e.g., any of the methods provided herein. Each wind turbine 1202 may further be arranged into groups. For example, wind turbines 1202a-1202f may be arranged into group 1204, and wind turbines 1202g-1202k may be arranged into group 1206. Each wind turbine 1202 may further comprise one or more controllers (not pictured) to control the one or more modifiable characteristics of each wind turbine 1202.

A controller at each wind turbine 1202 and/or control system 1208 may estimate excessive loads employing, e.g., any of the load estimation/determination techniques described herein. For example, wind turbine 1202g may be subject to a sudden wind gust 1208. Depending on, e.g., the current configuration of wind turbine 1202g, wind gust 1208 may cause excessive loads on wind turbine 1202g. In response, one or more controllers at wind turbine 1202g may modify one or more characteristics. For example, a controller may modify the yaw of wind turbine 1202g such that the wind turbine faces directly into the wind gust. Additionally or alternatively, a controller may adjust the pitch or yaw of one or more blades, may deploy or retract an air deflector on one or more blades, and/or may extend or retract a tip portion of one or more blades. Further, wind turbine 1202g may be communicatively coupled to one or more of controllers of the other wind turbines 1202a-1202k via, e.g., control system 1208. Accordingly, other wind turbines 1202 may use load estimation or determination and/or characteristic modification data from wind turbine 1202g in order to modify characteristics in preparation for, e.g., a wind gust 1208. For example, if 1202g is subjected to wind gust 1208 which causes excessive loads, and wind turbine 1202g thus modifies a yaw angle of wind turbine 1202g in response, one or more of the other wind turbines 1202 may adjust their respective yaw angle in preparation of wind gust 1208. Accordingly, wind turbines such as, e.g., 1202h and 1202e, which may be located far downwind from wind turbine 1202g, may compensate for wind gust 1208 before such a gust ever reaches each turbine. Thus, in this embodiment, controllers distributed throughout multiple wind turbines may be used to increase efficiency and/or reduce failures of wind turbines 1202 by using feedback from one or more turbines.

Wind farm 1200 may further comprise groupings of wind turbines such as, e.g., groups 1204 and 1206. Accordingly, characteristics of each turbine 1202 may only be modified when, e.g., other turbines in the same group are modified. For example, it may be determined that wind turbines 1202a-1202f generally experience the same environmental conditions as each other due to, e.g., their location on a ridge, while wind turbines 1202g-1202k usually experience the same environmental conditions as each other but that are typically distinct from those experienced by wind turbines 1202a-1202f. Thus, wind turbines 1202a-1202f may be grouped into group 1204, and wind turbines 1202g-1202k may be grouped into group 1206. Accordingly, when wind turbine 1202g experiences, e.g., wind gust 1208, it may adjust any number of characteristics as explained above, and the other turbines grouped with wind turbine 1202g in group 1206 (i.e., wind turbines 1202h-1202k) may similarly adjust characteristics to compensate for expected increased loads, while wind turbines in group 1204 (i.e., wind turbines 1202a-1202f) may not modify any characteristics in response. Accordingly, in some aspects of the present disclosure, a distributed control system can be used to increase efficiency and decrease failure of groupings of wind turbines 1202 which are typically exposed to similar environmental conditions.

The methods and features recited herein may further be implemented through any number of computer readable media that are able to store computer readable instructions. Examples of computer readable mediums that may be used include RAM, ROM, EEPROM, flash memory or other memory technology, CD-ROM, DVD or other optical disk storage, magnetic cassettes, magnetic tape, magnetic storage and the like.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

I claim:

1. A wind turbine comprising:
   a hub;
   a plurality of wind turbine blades connected to and arranged about the hub; and
   a plurality of controllers, wherein a first controller of the plurality of controllers is configured to modify a first characteristic of at least one wind turbine blade of the plurality of wind turbine blades, wherein a second controller of the plurality of controllers is configured to modify the first characteristic of the at least one wind turbine blade, and
   wherein each of the first controller and the second controller is configured to independently perform calculations and determine a load of the at least one wind turbine blade.

2. The wind turbine of claim 1, wherein the at least one wind turbine blade comprises:
   a first pressure sensing orifice arranged on a bottom surface of the at least one wind turbine blade; and
   a second pressure sensing orifice arranged on a top surface of the at least one wind turbine blade, wherein the first controller is further configured to determine at least one aerodynamic force associated with the at least one wind turbine blade based on a difference in pressure between a location of the first pressure sensing orifice and a location of the second pressure sensing orifice, and wherein the first controller is configured to modify the first characteristic in response to the determining the at least one aerodynamic force.

3. The wind turbine of claim 2, wherein the first controller is further configured to determine the aerodynamic load based on a received rotation speed of the at least one wind turbine blade, a received ambient air pressure, a received ambient air temperature, and a received pitch angle of the at least one wind turbine blade.

4. The wind turbine of claim 1, wherein the second controller is further configured to:
   determine if the first controller has modified the first characteristic of the at least one wind turbine blade; and
   in response to determining the first controller has not modified the first characteristic of the at least one wind turbine blade, modify the first characteristic of the at least one wind turbine blade.

5. The wind turbine of claim 1, wherein the first controller is further configured to modify a second characteristic of the at least one wind turbine blade, wherein the second characteristic is different than the first characteristic.

6. The wind turbine of claim 5, wherein each of the first characteristic and second characteristic is one of: a pitch angle of the at least one wind turbine blade; a yaw angle of the wind turbine; a position of a tip portion of the at least one wind turbine blade; and a position of an air deflector on the at least one wind turbine blade.

7. A method for controlling wind turbines, the method comprising:
   receiving, from a controller at a first wind turbine by a controller at a second wind turbine, an estimated aerodynamic load associated with a blade at the first wind turbine, wherein the controller at the first wind turbine estimates the aerodynamic load associated with the blade at the first wind turbine based on a determined pressure differential between a first pressure location and a second pressure location on the blade at the first wind turbine; and
   in response to receiving the estimated aerodynamic load associated with the blade at the first wind turbine, modifying, by the controller at the second wind turbine, a characteristic of the second wind turbine.

8. The method of claim 7, wherein the controller at the first wind turbine further estimates the aerodynamic load associated with the blade at the first wind turbine based on a received rotation speed of the blade at the first wind turbine, a received ambient air pressure, a received ambient air temperature, and a received pitch angle of the blade at the first wind turbine.

9. The method of claim 7, wherein the controller at the first wind turbine modifies a characteristic of the first wind turbine in response to the estimating the aerodynamic load associated with the blade at the first wind turbine.

10. The method of claim 9, wherein the characteristic of the first wind turbine is a yaw angle of the first wind turbine, and wherein the characteristic of the second wind turbine is a yaw angle of the second wind turbine.

11. The method of claim 9, wherein the characteristic of the first wind turbine is a pitch angle of the blade of the first wind turbine, and wherein the characteristic of the second wind turbine is a pitch angle of a blade of the second wind turbine.

12. The method of claim 9, wherein the modifying the characteristic of the first wind turbine comprises deploying an air deflector on the blade of the first wind turbine, and wherein the modifying the characteristic of the second wind turbine comprises deploying an air deflector on a blade of the second wind turbine.

13. The method of claim 9, wherein the modifying the characteristic of the first wind turbine comprises extending a tip portion of the blade of the first wind turbine, and wherein the modifying the characteristic of the second wind turbine comprises extending a variable length portion of a blade of the second wind turbine.

14. A system for controlling wind turbines, the system comprising:
- a plurality of wind turbines arranged in a plurality of groups; and
- a controller at each of the plurality of wind turbines, wherein each controller is configured to modify at least one characteristic of a corresponding wind turbine, wherein the system is configured to:
    - estimate an aerodynamic load associated with a blade of a first wind turbine of the plurality of wind turbines in a first group of the plurality of groups based on a determined pressure differential between a first pressure location and second pressure location on the blade of the first wind turbine; and
    - in response to the estimating the aerodynamic load associated with the blade of the first wind turbine, modify, by the controller at each wind turbine in the first group, a characteristic of each wind turbine in the first group.

15. The system of claim 14, wherein the system is further configured to estimate the aerodynamic load associated with the blade of the first wind turbine based on a determined rotation speed of the blade of the first wind turbine, a determined ambient air pressure, a determined ambient air temperature, and a determined pitch angle of the blade of the first wind turbine.

16. The system of claim 14, wherein the characteristic modified at each wind turbine in the first group is a yaw angle of each wind tubrine in the first group.

17. The system of claim 14, wherein the characteristic modified at each wind turbine in the first group is a pitch angle of at least one blade at each wind turbine in the first group.

18. The system of claim 14, wherein the characteristic modified at each wind turbine in the first group is one of: deploying an air deflector on at least one blade at each wind turbine in the first group; and retracting the air deflector on the at least one blade at each wind turbine in the first group.

19. The system of claim 14, wherein the characteristic modified at each wind turbine in the first group is one of: extending a tip portion of at least one blade at each wind turbine in the first group; and retracting the tip portion of the at least one blade at each wind turbine in the first group.

20. The system of claim 14, wherein the system is further configured to:
- estimate an aerodynamic load associated with a blade of a second wind turbine of the plurality of wind turbines in a second group of the plurality of groups based on a determined pressure differential between a first pressure location and second pressure location on the blade of the second wind turbine; and
- in response to estimating the aerodynamic load associated with the blade of the second wind turbine, modify, by the controller at each wind turbine in the second group, a characteristic of each wind turbine in the second group.

* * * * *